(12) United States Patent
Bode

(10) Patent No.: US 8,674,265 B2
(45) Date of Patent: Mar. 18, 2014

(54) STRETCH-BROKEN CARBON FIBER YARNS FOR A HEATING DEVICE

(75) Inventor: Reiner Bode, Aindling (DE)

(73) Assignee: SGL Carbon SE, Wiesbaden (DE)

( * ) Notice: Subject to any disclaimer, the term of this patent is extended or adjusted under 35 U.S.C. 154(b) by 857 days.

(21) Appl. No.: 12/548,595

(22) Filed: Aug. 27, 2009

(65) Prior Publication Data

US 2010/0051605 A1   Mar. 4, 2010

(30) Foreign Application Priority Data

Aug. 27, 2008 (DE) .......................... 10 2008 039 840

(51) Int. Cl.
*H05B 11/00* (2006.01)
*B60L 1/02* (2006.01)
*H05B 3/34* (2006.01)

(52) U.S. Cl.
USPC ............ 219/200; 219/202; 219/528; 219/529

(58) Field of Classification Search
USPC ......... 219/200, 202, 528, 529, 538, 541, 542, 219/545, 547–549; 174/117 F; 250/305; 438/375
See application file for complete search history.

(56) References Cited

U.S. PATENT DOCUMENTS

| | | | | |
|---|---|---|---|---|
| 4,518,851 A | * | 5/1985 | Oppitz ........................... | 219/528 |
| 4,792,662 A | * | 12/1988 | Kitagaki et al. .............. | 219/545 |
| 4,825,635 A | | 5/1989 | Guevel et al. | |
| 4,983,814 A | * | 1/1991 | Ohgushi et al. ............... | 219/545 |
| 5,298,722 A | * | 3/1994 | Tanaka .......................... | 219/545 |
| 5,422,462 A | * | 6/1995 | Kishimoto .................... | 219/545 |
| 5,484,983 A | * | 1/1996 | Roell ............................. | 219/545 |
| 5,824,959 A | * | 10/1998 | Mista et al. ................. | 174/117 F |
| 6,064,037 A | | 5/2000 | Weiss et al. | |
| 6,150,642 A | * | 11/2000 | Weiss et al. ................... | 219/528 |
| 6,194,692 B1 | * | 2/2001 | Oberle ......................... | 219/528 |
| 6,369,369 B2 | | 4/2002 | Kochman et al. | |
| 6,545,253 B2 | * | 4/2003 | Lin et al. ....................... | 219/528 |
| 7,115,844 B2 | * | 10/2006 | Ferguson ...................... | 219/528 |
| 7,714,254 B2 | * | 5/2010 | Spee et al. .................... | 219/200 |
| 7,867,612 B2 | * | 1/2011 | Schwung et al. ............. | 428/375 |
| 7,884,307 B2 | * | 2/2011 | Li et al. ........................ | 219/545 |
| 7,902,502 B2 | * | 3/2011 | David .......................... | 250/305 |

FOREIGN PATENT DOCUMENTS

| | | |
|---|---|---|
| DE | 4233118 A1 | 1/1994 |
| DE | 29924210 U1 | 5/2002 |
| DE | 102005050459 B3 | 3/2007 |
| EP | 0274970 B1 | 10/1991 |
| WO | 9855340 A1 | 12/1998 |

* cited by examiner

*Primary Examiner* — Trong Phan

(74) *Attorney, Agent, or Firm* — Laurence A. Greenberg; Werner H. Stemer; Ralph E. Locher

(57) ABSTRACT

A heating device is formed from an electrically conducting, flexible resistance material of carbon fibers arranged between at least two electrodes provided for electrical contacting. The carbon fibers are stretch-broken carbon fiber yarns with a titer of 30 tex to 800 tex and a resistivity of 100 to 600 Ω/m.

9 Claims, 2 Drawing Sheets

STRETCH-BROKEN CARBON FIBER YARNS FOR A HEATING DEVICE

CROSS-REFERENCE TO RELATED APPLICATION

This application claims the priority, under 35 U.S.C. §119, of German application DE 10 2008 039 840.3, filed Aug. 27, 2008; the prior application is herewith incorporated by reference in its entirety.

BACKGROUND OF THE INVENTION

Field of the Invention

The invention relates to a heating device formed from an electrically conducting, flexible resistance material of carbon fibers arranged between at least two electrodes for electrical contacting.

Heating elements have many applications in domestic appliances, for building purposes or in industrial processes. Their physical properties, such as for example thickness, form, size, strength, flexibility and other properties, influence their suitability for use in many application areas.

A method for producing yarn from carbon fibers is known from European patent EP 0 274 970 B1, corresponding to U.S. Pat. No. 4,825,635. With a splitting process involving stretching and controlled breaking, carbon multifilaments are processed into fibers, which are converted into yarns on a classic spinning machine.

German Utility Model DE 29924210 U1 discloses electrical heating elements which contain a soft and firm electrically conductive core, containing metal or carbon, and filaments/fibers. The meandering heating elements contain a woven C-fiber fabric of a predetermined form that is filled with a soft material, such as starch, electrical contact members and electrical insulating films placed on both surfaces.

Published, non-prosecuted German patent application DE 42 33 118 A1 describes heating mats which contain an electrically conducting flexible carbon-based resistance wire. The flexible resistance wire in this case contains a woven fabric formed from carbon fibers, worked into which are flexible contact wires, which represent the electrodes. The fabric has a relatively high electrical resistance and, on account of this electrical resistance, heats up when current flows through.

German patent DE 10 2005 050 459 B3 describes a flexible surface heating element, in particular for seat heaters, with a heating area of conductive fibers which are connected in an electrically conducting manner to at least one contact strip, which heating element is characterized in that the at least one contact strip contains a proportion of conductors in the form of steel filaments and a proportion of conductors in the form of filaments of a higher conductivity than the steel filaments.

International patent disclosure WO 9855340 A1, corresponding to U.S. Pat. No. 6,064,037, describes an air conditioning device for a seat having an air-permeable base body, which is arranged under a seat surface, and a heating element, which is arranged in the base body or between the seat surface and the base body. The heating element contains a carbon multifilament or a mixed carbon-fiber yarn.

In particular in heaters for car seats, 1K and 3K CF-rovings are used, which are very expensive and cannot be supplied to an adequate extent. In the case of rovings >3K, on the other hand, the electrical resistance is too low. CF stands here for carbon fiber; rovings are bundles of continuous, untwisted, stretched fibers and K stands for 1,000 filaments.

SUMMARY OF THE INVENTION

It is accordingly an object of the invention to provide stretch-broken carbon fiber yarns for a heating device, which overcomes a variety of disadvantages associated with the heretofore-known devices of this general type of the prior art.

The subject matter of the invention is a heating device based on an electrically conducting, flexible resistance material of carbon fibers. The heating device is arranged between two electrodes for the electrical contacting. The carbon fibers according to the invention are stretch-broken carbon fiber yarns with a titer of 30 tex to 800 tex and a resistivity of 100 to 600 Ω/m.

With particular preference, the stretch-broken carbon fibers are treated with a size. The size is a tincture of either starch or cellulose. With the size according to the invention, the smoothness, tear strength and sliding properties of the stretch-broken carbon fiber is increased.

According to the present invention, a stretching-breaking-spinning process can be used for example to produce a staple fiber yarn which corresponds in titer to a 1K or 3K continuous roving from a low-cost 45K or 50K roving. The stretch-broken carbon fiber yarns advantageously exhibit low fluctuations of the electrical resistances.

The stretch-broken carbon fiber yarns surprisingly have a particularly high elongation at break, which for example increases the sitting comfort in motor vehicles.

Other features which are considered as characteristic for the invention are set forth in the appended claims.

Although the invention is described herein as embodied in a stretch-broken carbon fiber yarns for a heating device, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

Figure 1:
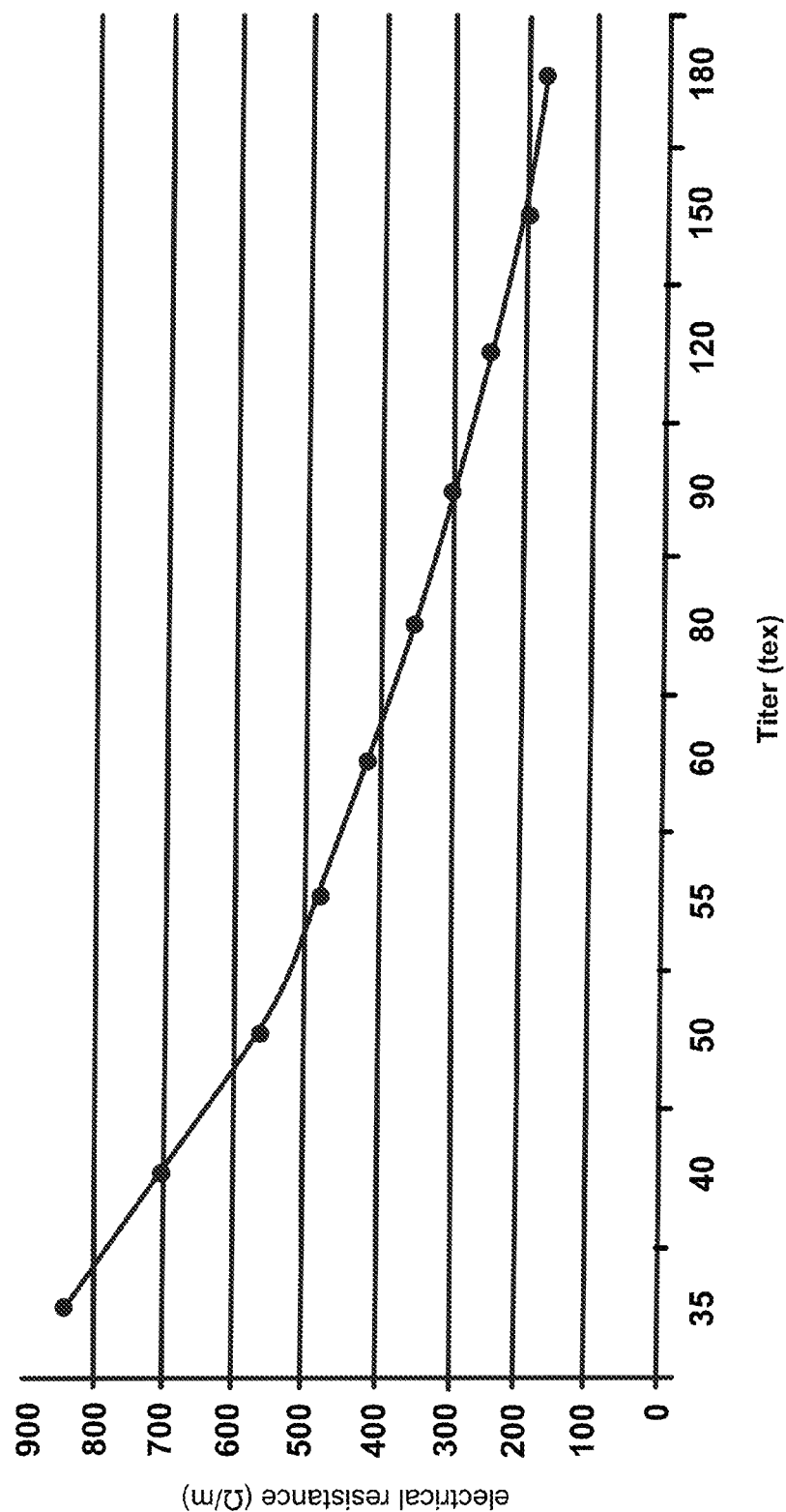
FIG. 1 is a graph plotting electrical resistance and yarn titer according to the invention.

Stretch-broken yarns can also be produced in "intermediate titers", with it being possible with particular preference for the electrical resistance to be individually set by way of the yarn titer (see the FIGURE of the drawing). For example, it can be seen at 120 tex (1.8 K) in the FIGURE that the electrical resistance of the stretch-broken yarns produced in titers can be set at 170 Ω/m. The stretch-broken carbon fiber yarns according to the invention offer considerable cost advantages over the conventional 1K or 3K continuous rovings. The stretch-broken carbon fiber yarns correspond for example in titer approximately to a continuous roving of 1K or 3K.

With particular preference, the stretch-broken carbon fiber yarns are joined to a textile backing material. The backing material contains a textile synthetic fiber backing material or related materials, such as for example cotton, with contact strips and heating conductors woven into the backing material.

It may be expedient for the heating layer to contain a carbon fiber nonwoven or a textile with carbon filaments sewn on, with stretch-broken carbon fiber yarns being respectively used. These materials are easy to handle and have a homogeneous resistance distribution.

An upholstery element may be created, for example containing a molded foam element with a flexible or relatively dimensionally stable structure. The form of the heating surface is in this case variable. In its outer appearance it may, for instance, be angular, round or curved. The function and the surface heating power density are in any case not impaired, because of the textile structure of the heating element. It can operate not only in an angular or round state but also likewise in a curved or bent state. If there is any impairment at all, it may be when the contact conductor is completely severed by a cut, break or rupture.

The upholstery element may in principle be any conceivable interior part in the vehicle that can be provided with a heating device in the way described. With particular preference, the heating device is a component part of a seat cushion or backrest or side padding of a vehicle seat. The heating device is preferably also suitable for heating other upholstery parts in the interior of a vehicle, such as for example an interior door panel.

The heating device preferably has an open-loop and closed-loop control device. This also includes optical devices, such as for example one or more LEDs or OLEDs.

It is further preferred that the heating device has a temperature sensor. Alternatively, temperature self-limiting properties may also be provided.

With preference, the heating device is used in a temperature range from 20 to 35° C. as seat heating for vehicles, with particular preference as seat heating for motor vehicles.

It is further preferred that the seat heating is used in the temperature range of 5 to 45° C. as a medical bandage.

Furthermore, the seat heating is used in the temperature range from 45 to 400° C. preferably as mold heating for composite polymer-fiber components.

Furthermore (without being intended as a restriction), the heating device may be used:
(a) in the form of heating cables for liquids of all types, for example for controlling the temperature of aquariums, it being possible for this to supplement a thermostatic control;
(b) for electrically heated blankets, cushions, mattresses, sheets and carpets;
(c) for walls, office partitions, in the slats of Venetian blinds, fan blades, furniture, and electric ceiling or floor heating devices;
(d) for heating devices in the seats of cars, mopeds, motorcycles, boats and airplanes;
(e) for electrically heated life vests, clothes, boots, gloves, hats and diving suits;
(f) for containers for transporting items of food and sleeping bags;
(g) for deicing systems for refrigerators, roads, roofs and the propellers of airplanes or helicopters;
(h) for electrical heating devices for pipelines, drums and tanks;
(i) in ignition devices for electrical burners, as well as various further applications for pipe heaters, antennas and electrostatic filters as well as a heating tube for instantaneous water heaters.

It may be expedient for the electrical conductivity of the heating layer to be locally reduced. This allows a differentiated temperature setting.

Electrically conductive or conductively coated films, knitted, woven or nonwoven fabrics come into consideration, for example, as materials for the heating layer. Stretch-broken carbon fiber yarns are suitable in particular here as electronic conductors.

For safety reasons and from physiological aspects, the heating device is configured for DC voltage or low voltage. However, operation with AC voltage is also conceivable.

Figure 2:
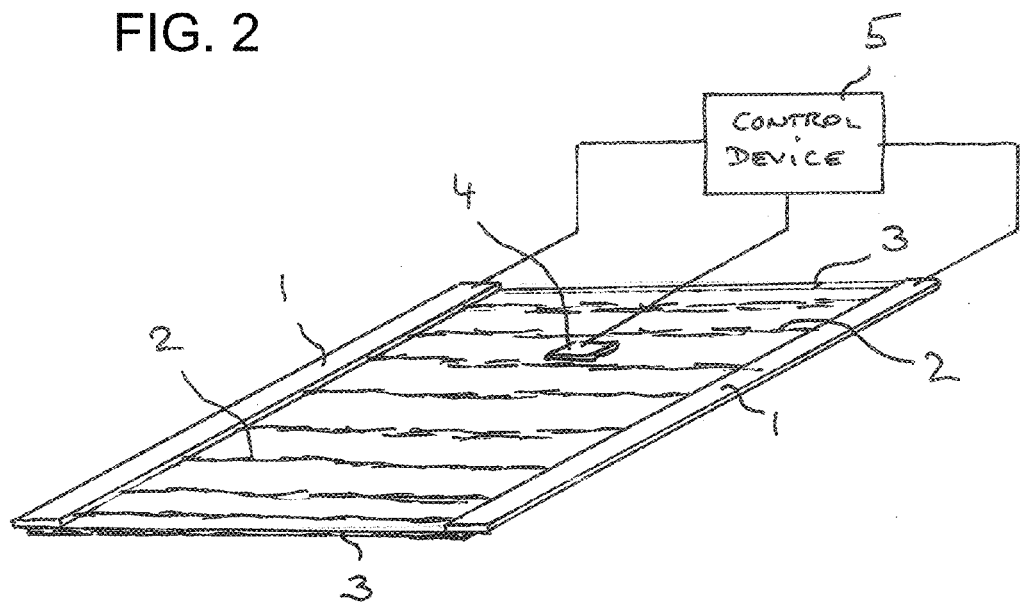
FIG. 2 is a diagrammatic illustration of an exemplary heating device according to the invention.

FIG. 2 is a diagrammatic illustration of an exemplary heating device. Two electrodes 1 are interconnected by several yarns 2 of stretch-broken carbon fibers. The yarns 2 are connected to a textile backing material 3. A temperature sensor 4 is disposed to measure a temperature of the device. A closed-loop/open-loop control device 5 is connected to the electrodes 1 and also to the temperature sensor 4.

The invention claimed is:

1. A heating device, comprising:
at least two electrodes for electrical contacting; and
an electrically conducting, flexible resistance material of carbon fibers disposed between said at least two electrodes, said carbon fibers being stretch-broken carbon fiber yarns with a titer of 30 tex to 800 tex and a resistivity of 100 to 600 Ω/m.

2. The heating device according to claim 1, wherein said stretch-broken carbon fibers are treated with a size.

3. The heating device according to claim 1, further comprising a textile backing material, said stretch-broken carbon fiber yarns are joined to said textile backing material.

4. The heating device according to claim 1, further comprising an open-loop and closed-loop control device.

5. The heating device according to claim 1, further comprising a temperature sensor.

6. A method of using heating devices, which comprises the steps of:
providing a heating device containing at least two electrodes for electrical contacting and an electrically conducting, flexible resistance material of carbon fibers disposed between the at least two electrodes, the carbon fibers being stretch-broken carbon fiber yarns with a titer of 30 tex to 800 tex and a resistivity of 100 to 600 Ω/m; and
heating a vehicle seat in a temperature range from 20 to 35° C. via the heating device.

7. A method for heating a vehicle seat of a motor vehicle, which comprises the steps of:
providing a heating device containing at least two electrodes for electrical contacting and an electrically conducting, flexible resistance material of carbon fibers disposed between the at least two electrodes, the carbon fibers being stretch-broken carbon fiber yarns with a titer of 30 tex to 800 tex and a resistivity of 100 to 600 Ω/m; and
heating the vehicle seat via the heating device.

8. A method of using a heating device, which comprises the step of:
providing the heating device containing at least two electrodes for electrical contacting and an electrically conducting, flexible resistance material of carbon fibers disposed between the at least two electrodes, the carbon fibers being stretch-broken carbon fiber yarns with a titer of 30 tex to 800 tex and a resistivity of 100 to 600 Ω/m; and
using the heating device as a medical bandage in a temperature range from 5 to 45° C.

9. A method of using a heating device, which comprises the steps of:

provinding a heating device containing at least two electrodes for electrical contacting and an electrically conducting, flexible resistance material of carbon fibers disposed between the at least two electrodes, the carbon fibers being stretch-broken carbon fiber yarns with a titer of 30 tex to 800 tex and a resistivity of 100 to 600 $\Omega$/m; and using the heating device for heating a mold for composite polymer-fiber components in a temperature range from 45 to 400° C.

* * * * *